(12) United States Patent  (10) Patent No.: US 7,970,555 B2
Kernozicky et al.  (45) Date of Patent: Jun. 28, 2011

(54) METHOD FOR DEVELOPING A REPAIR PROCESS TO CORRECT A DEFORMED GAS TURBINE ENGINE COMPONENT

(75) Inventors: Garrett Kernozicky, Mansfield, CT (US); Ephraim C. Davis, No Richland Hills, TX (US); Thomas P. Cap, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 646 days.

(21) Appl. No.: 12/082,865

(22) Filed: Apr. 15, 2008

(65) Prior Publication Data
US 2009/0255115 A1 Oct. 15, 2009

(51) Int. Cl.
*G01B 3/44* (2006.01)
*G06F 19/00* (2006.01)
(52) U.S. Cl. ......................................................... 702/34
(58) Field of Classification Search ..................... 702/34
See application file for complete search history.

(56) References Cited

U.S. PATENT DOCUMENTS

| | | | |
|---|---|---|---|
| 3,653,128 A | 4/1972 | Palmenberg | |
| 4,146,967 A | 4/1979 | Rohner et al. | |
| 4,454,656 A | 6/1984 | Arrigoni | |
| 4,639,991 A | 2/1987 | Sharon | |
| 4,856,943 A | 8/1989 | Nelson et al. | |
| 4,866,828 A | 9/1989 | Fraser | |
| 4,908,782 A | 3/1990 | Pekarek et al. | |
| 5,063,662 A | 11/1991 | Porter et al. | |
| 5,162,659 A | 11/1992 | Diamond et al. | |
| 5,625,958 A | 5/1997 | DeCoursey et al. | |
| 5,771,726 A | 6/1998 | Bibby et al. | |
| 6,209,216 B1 | 4/2001 | Bear | |
| H2057 H * | 1/2003 | Veers et al. | 416/230 |
| 6,792,655 B2 | 9/2004 | Wah | |
| 6,959,572 B2 | 11/2005 | Lawrence et al. | |
| 2003/0088958 A1 * | 5/2003 | Wah | 29/23.51 |
| 2007/0084050 A1 | 4/2007 | Davis et al. | |
| 2009/0313822 A1 * | 12/2009 | Lee et al. | 29/889.1 |

* cited by examiner

*Primary Examiner* — Michael P Nghiem
*Assistant Examiner* — Cindy H Khuu
(74) *Attorney, Agent, or Firm* — Kinney & Lange, P.A.

(57) ABSTRACT

A method of developing a repair process for a gas turbine engine component deformed during engine operation includes determining peak stress locations in a model of the component, applying loads to sample components based on the model to produce geometrical correction values in the samples, generating data from the samples including the loads applied and the geometrical correction values produced, destructively analyzing the samples at the peak stress locations for structural imperfections, and correlating the loads applied to the geometrical correction values produced to determine allowable loads necessary to produce target geometrical correction values in a used component substantially free of structural imperfections.

25 Claims, 6 Drawing Sheets

METHOD FOR DEVELOPING A REPAIR PROCESS TO CORRECT A DEFORMED GAS TURBINE ENGINE COMPONENT

STATEMENT OF GOVERNMENT INTEREST

The Government may have certain rights in this invention pursuant to Contract No. F33657-99-D-2051 awarded by the United States Air Force.

CROSS-REFERENCE TO RELATED APPLICATION(S)

The present application is related to the following copending applications filed on the same day as this application: "TURBINE BLADE TWIST ANGLE CORRECTION TOOLING" by inventors Ephraim C. Davis, Bryan G. Parrette, and Larry D. Cronin (U.S. application Ser. No. 12/082,896); and "METHODS FOR CORRECTING TWIST ANGLE IN A GAS TURBINE ENGINE BLADE" by inventors Garrett Kernozicky, Ephraim C. Davis, Thomas P. Cap, and Paul Balko (U.S. application Serial No. 12/082,864). All of these applications are incorporated herein by this reference.

BACKGROUND

The present invention relates to turbine blade repair procedures and tooling. In particular, the present invention relates to a method for developing repair procedures to correct deformed gas turbine engine components.

A gas turbine engine commonly includes a fan, a compressor, a combustor and a turbine. During engine operation, working medium gases, for example air, are drawn into the engine by the fan and directed into and compressed in the compressor. The compressed air is channeled to the combustor where fuel is added to the air and the air/fuel mixture is ignited. The products of combustion are discharged to the turbine section, which extracts work from these products to power the compressor and produce useful thrust to power, for example, an aircraft in flight.

The compressor and turbine commonly include alternating stages of rotor blades and stator vanes. Compressor and turbine blades and vanes often include complex, contoured airfoil geometries designed to optimally interact with the working medium gas passing through the engine. One common feature of airfoil geometries is the blade twist angle. The twist angle is the angular displacement of the airfoil about a spanwise axis, such as the stacking axis, from the root to the tip of the airfoil. During normal engine operation, the blade twist angle feature, which is a critical characteristic of gas turbine engine blades, decreases due to thermo-mechanical cycling and aerodynamic loading of the blades. The twist angle must be restored to the original manufactured condition during engine overhaul prior to returning the blade to service.

Turbine blade twist correction is commonly accomplished by clamping the blade root in a fixture and manually applying a load to the tip of the blade using, for example a two-handed wrench configured to clamp the blade tip. An operator twists the blade using the wrench, measures the blade twist angle, and repeats the twisting procedure until the correct twist angle is reached. Because the operator can only estimate how much force to apply each time, this approach often requires many iterations to achieve the desired twist angle. This results in a time-consuming, labor-intensive and costly process. This approach can also result in over-twist due to applying excessive force. Over-twisting is particularly problematic in blades prone to micro-cracking, such as blades made from a directionally solidified nickel alloy.

Therefore, improved tools and methods for correcting blade twist angle are needed.

SUMMARY

A method of developing a repair process for a gas turbine engine component deformed during engine operation includes determining peak stress locations in a model of the component, applying loads to sample components based on the model to produce geometrical correction values in the samples, generating data from the samples including the loads applied and the geometrical correction values produced, destructively analyzing the samples at the peak stress locations for structural imperfections, and correlating the loads applied to the geometrical correction values produced to determine allowable loads necessary to produce target geometrical correction values in a used component substantially free of structural imperfections.

DETAILED DESCRIPTION

Figure 1A:
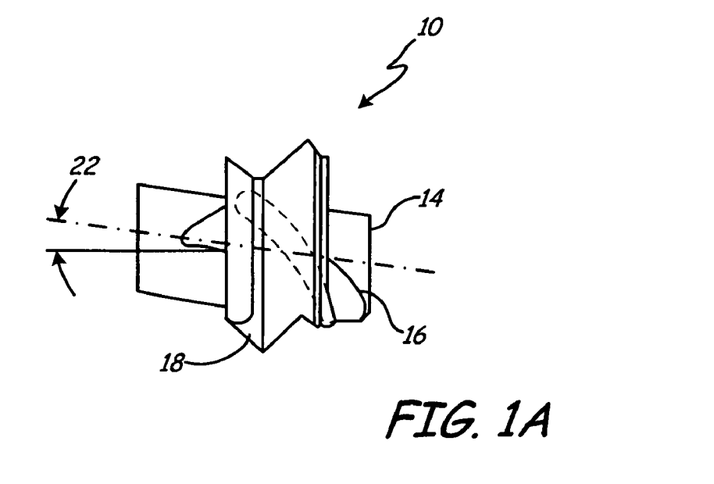
FIGS. 1A and 1B are top and side views respectively of a gas turbine blade having a twisted airfoil.
Figure 1B:
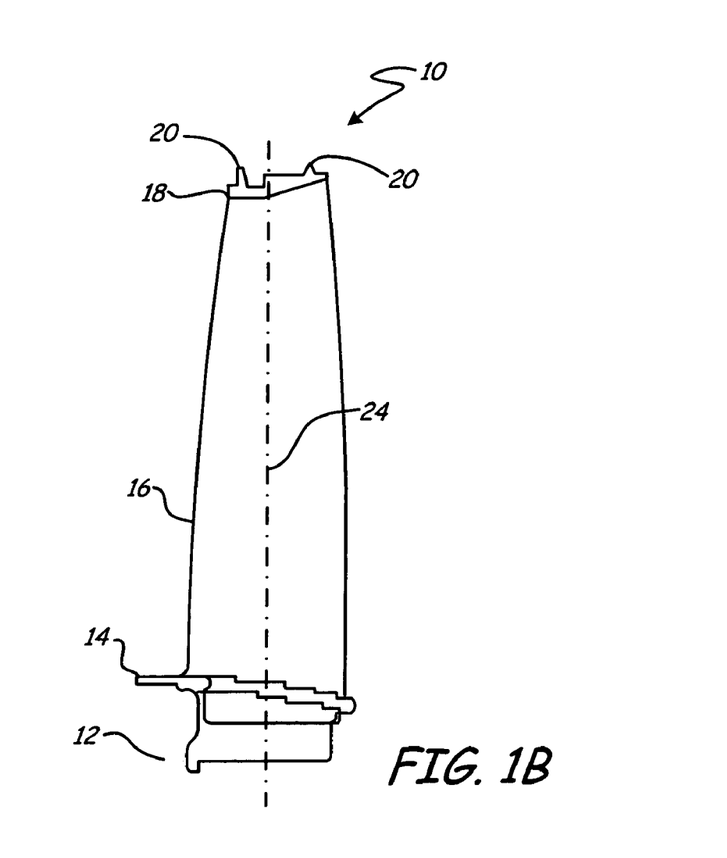

FIGS. 1A and 1B are top and side views respectively of twisted gas turbine blade 10, which includes root 12, platform 14, airfoil 16, shroud 18, and knife edges 20. In FIGS. 1A and 1B, blade 10 is a gas turbine blade including a twisted airfoil 16 which may be corrected by repair processes developed from methods according to the present invention. Blade 10 may be, for example, a shrouded high pressure turbine blade. Blade 10 includes root 12, which may include a dovetail or fir tree root configured to be received in a slot in the rim of a rotor disc. Blade 10 also includes platform 14 integral with and radially outward of root 12. Airfoil 16 of blade 10 extends radially from platform 14 to shroud 18. Shroud 18 includes knife edges 20 designed to engage, for example, a stationary honeycomb seal arranged radially outward of turbine blade 10 mounted in the rim of the rotor disc. Twist angle 22 of blade 10 is equal to the angular displacement of airfoil 16 about a spanwise axis, such as stacking axis 24 of airfoil 16, between platform 14 and shroud 18. During normal engine operation, twist angle 22 of blade 10 may decrease due to thermo-mechanical cycling and aerodynamic loading on blade 10. In order to extend the useful life of blade 10, twist angle 22 may be restored to the original manufactured condition during engine overhaul prior to returning blade 10 to service.

A twist angle repair apparatus may be used to correct twist angle 22 of blade 10. For example, root 12 of blade 10 may be clamped in a fixture. A twist angle gauge may be employed to measure an initial twist angle of blade 10 by, for example, contacting shroud 18. The twist angle gauge may then be disengaged from blade 10 and a wrench may be clamped to shroud 18 of blade 10. A measured load may be applied to the wrench to re-twist blade 10 to correct twist angle 22.

Figure 2:
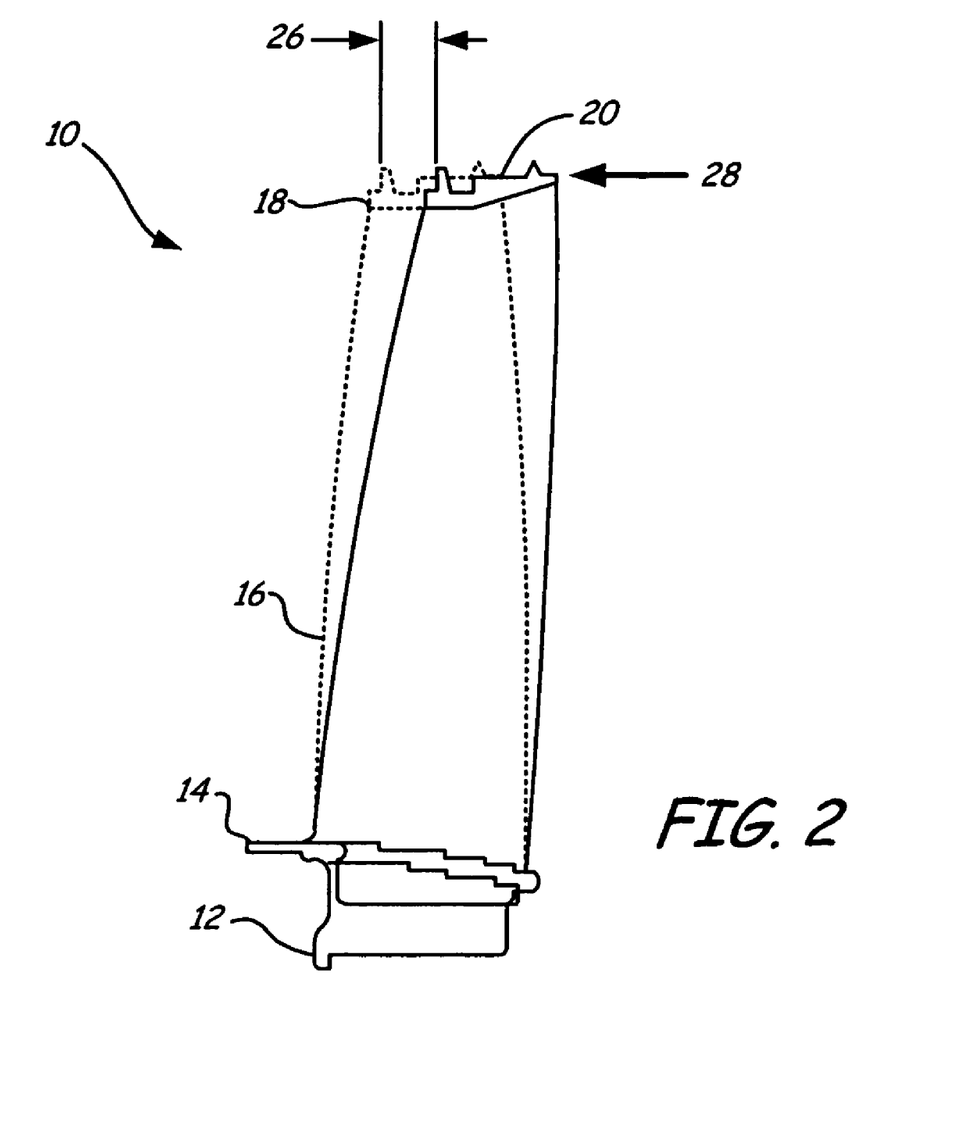
FIG. 2 is a side view of the blade of FIGS. 1A and 1B having an airfoil deformed axially with respect to the blade platform.

FIG. 2 shows blade 10 having an alternative geometric deformation that may necessitate repair of blade 10 during engine overhauls. In FIG. 2, airfoil 16 of blade 10 has deformed axially, "leaned," with respect to platform 14 by a distance 26. Airfoil 16 of blade 10 may be repaired by, for example, restraining root 12 of blade 10 and applying an axial load 28 to, for example, shroud 18 to reduce or remove the lean from airfoil 16.

Figure 3:
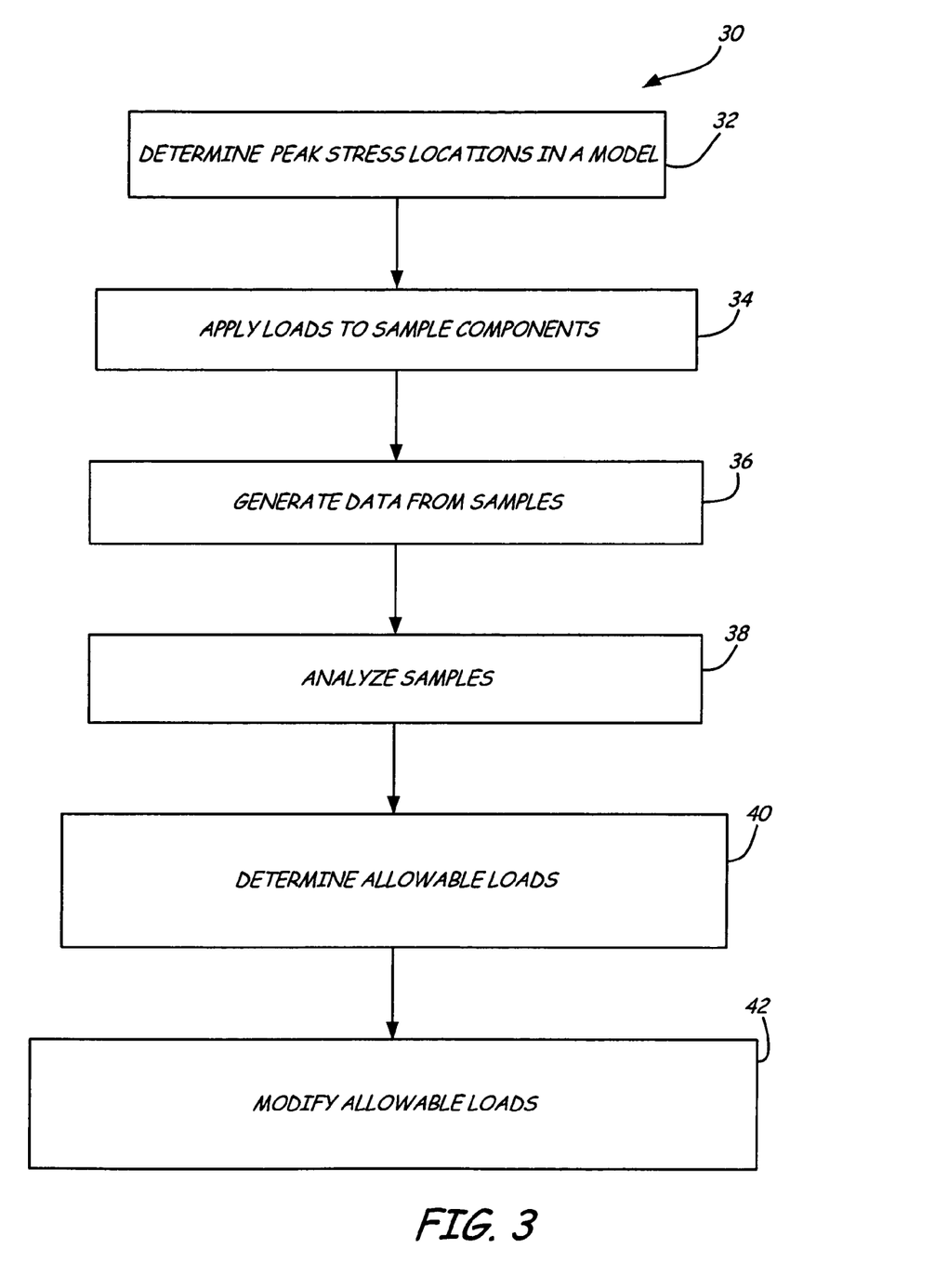
FIG. 3 is a flow chart illustrating a method according to embodiments of the present invention of developing a repair process for a gas turbine engine component deformed during engine operation.

FIG. 3 is a flow chart illustrating a method 30 according to embodiments of the present invention of developing a repair process for a gas turbine engine component deformed during engine operation, which method 30 includes determining the peak stress locations under an applied load in an analytical model of the component (step 32), applying a range of loads to sample components based on the model to produce a range of geometrical correction values in the samples (step 34), generating data from the samples including the loads applied and the. geometrical correction values produced (step 36), destructively analyzing the samples at the peak stress locations for one or more structural imperfections (step 38), correlating the loads applied to the geometrical correction values produced to determine a range of allowable loads necessary to produce a range of target geometrical correction values in a used component substantially free of structural imperfections (step 40), and modifying the range of allowable loads to account for one or more repair process steps that change the geometric correction value after the load has been applied to the used component (step 42).

Figure 4:
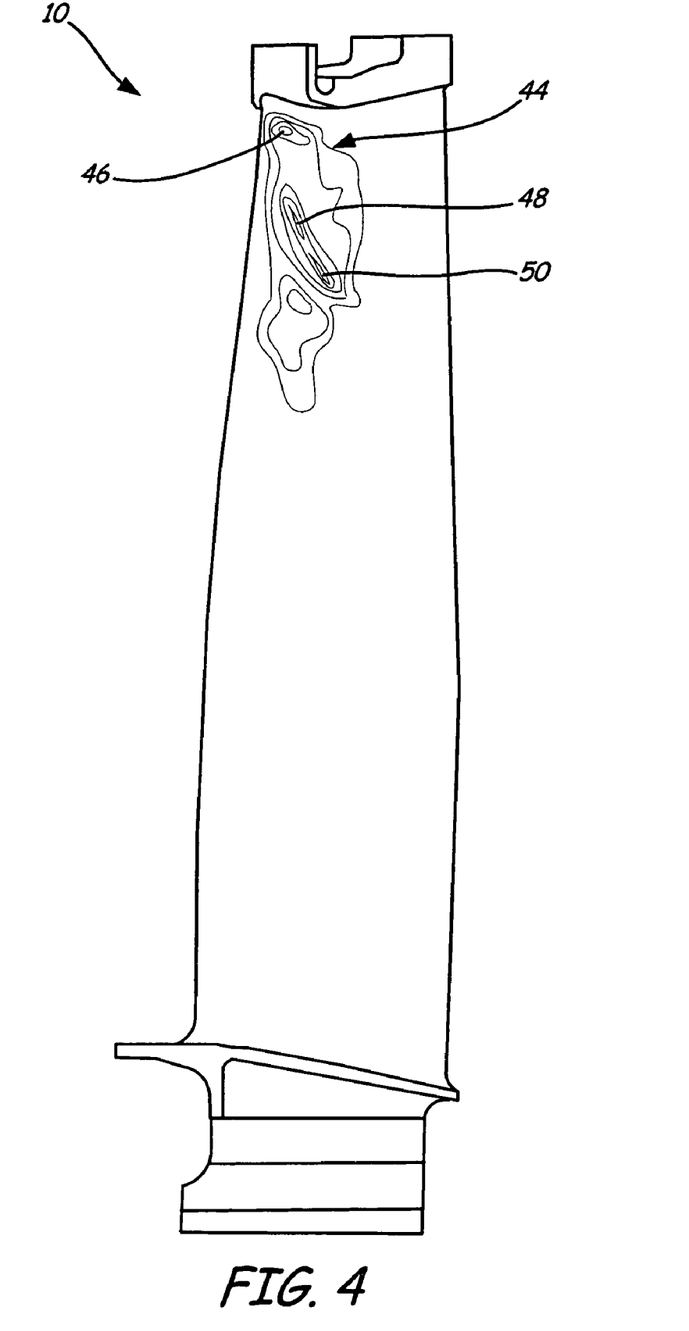
FIG. 4 is a front view of a computer generated model of the blade shown in FIGS. 1A and 1B.

Determining analytically peak stress locations in a model of the component (step 32) may include electronically analyzing a computer generated model of the component. For example, a commercially available software program, such as a Computer Aided Design (CAD) program, may be employed to generate a model of the turbine component. The CAD model may then be used by the same software program or imported into another software program for structural analysis. The analysis software may employ numerical methods, such as Finite Element Analysis (FEA), to determine regions of the component subject to high stress and therefore subject to the development of imperfections such as micro-cracking. FIG. 4 shows an example of a computer generated model of blade 10 including a contour plot 44 representing high stress regions 46, 48, 50 in blade 10.

Repair processes developed from methods according to the present invention, such as methods for correcting the twist angle in a turbine blade, are generally known as cold working processes. Cold working a material or component involves plastically deforming, i.e. yielding, the component, which permanently alters the material properties, e.g. the stress-strain relationship, of the component. Therefore, determining peak stress locations (32) may include determining analytically locations in a model of the component at which the component will yield under an applied load. In this way, both the locations at which the component is likely to yield and the magnitude of the load at which the component may yield may be analytically modeled for the component for which the repair process is being developed.

Referring again to FIG. 3, in addition to determining analytically peak stress locations in a model of the component (step 32), method 30 includes applying loads to sample components based on the model to produce geometrical correction values in the samples (step 34). In one embodiment of the present invention, applying loads to sample components to produce geometrical correction values in the samples (step 34) may include twisting sample airfoils to produce twist angle correction values in the sample airfoils. For example, a set of turbine blade samples with twisted airfoils, such as airfoil 16 of blade 10 shown in FIGS. 1A and 1B, may be restrained at root 12 using a fixture. A wrench may be used to clamp the tips of the blades, for example shroud 18 of blade 10, and to apply a range of measured torques to the tips of the blade samples. Applying the range of measured torques to the samples will produce a range of twist angle correction values in the samples. In another embodiment of the present invention, applying loads to sample components to produce geometrical correction values in the samples (step 34) may include applying axial loads toward the tip of sample airfoils to produce lean correction values in the sample airfoils. For example, a set of turbine blade samples, such as blade 10 shown in FIG. 2, may be restrained at root 12 and subjected to a range of axial loads toward the tip of the samples, such as shroud 18 of blade 10, to produce a range of lean correction values in the samples.

Method 30 also includes generating data from the samples including the loads applied and the geometrical correction values produced (step 36). For example, the load applied to and the corresponding geometrical correction value produced in each of the samples may be recorded, such as by writing the data down, storing the data in computer readable form, or otherwise storing the data for future use, such as by dictation onto a magnetic tape.

Figure 5:
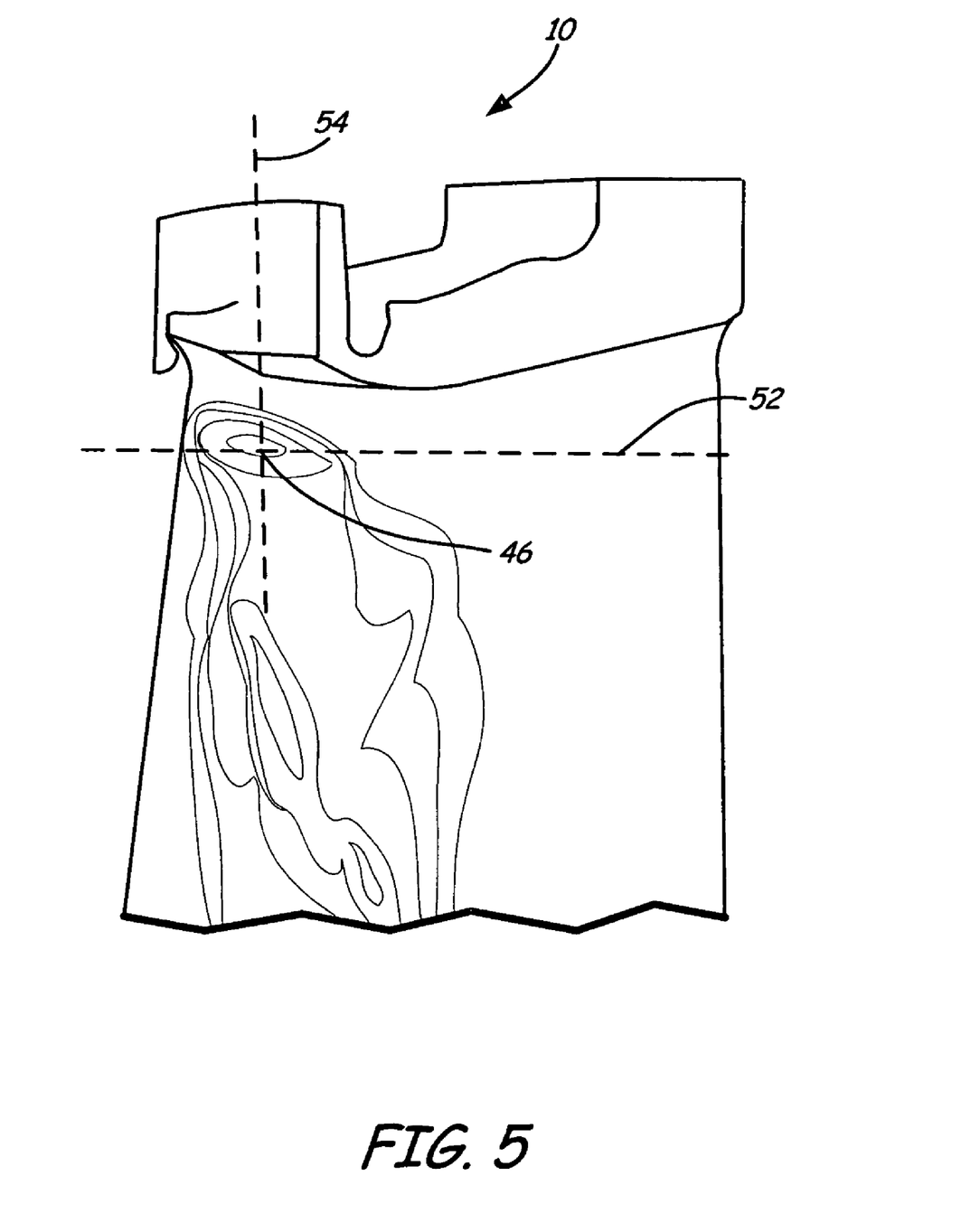
FIG. 5 is a detail view of the computer model of the blade shown in FIG. 4.

In addition to generating data from the samples including the loads applied and the geometrical correction values produced (step 36), method 30 includes destructively analyzing the samples at the peak stress locations for structural imperfections (step 38), such as micro-cracking. Destructively analyzing the samples at the peak stress locations for structural imperfections (step 38) may include cutting the samples along one or more cut lines intersecting the peak stress locations. For example, FIG. 5 is a detail view of the computer model of blade 10 shown in FIG. 4 illustrating cutting blade 10 along chordwise cut line 52 and spanwise cut line 54, which cut lines 52, 54 intersect with high stress region 46. After the samples have been cut along lines intersecting with the peak stress locations, the samples may be microscopically or macroscopically inspected for structural imperfections.

Figure 6:
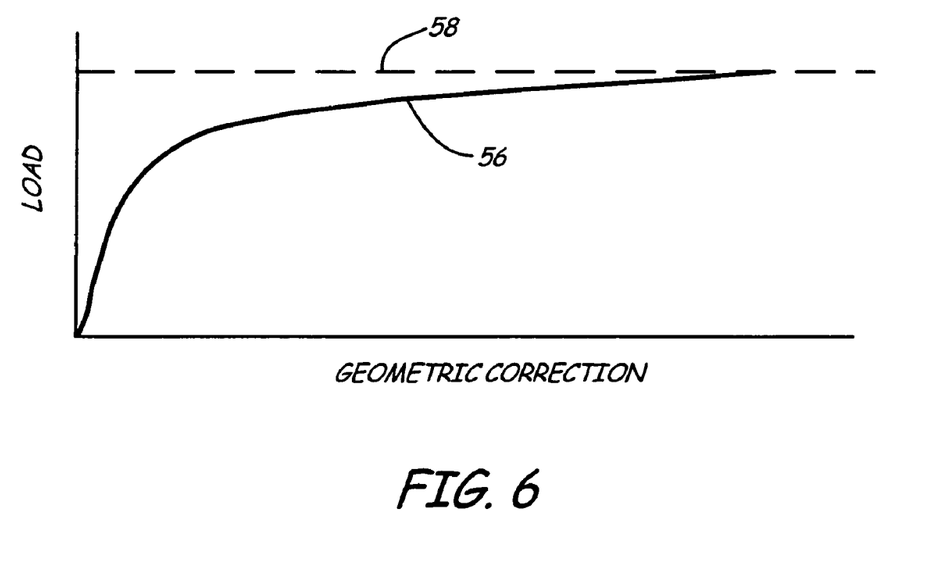
FIG. 6 is a graph of the load applied to sample gas turbine engine components versus the geometric correction value produced in the samples.

Method 30 illustrated in FIG. 3 also includes correlating the loads applied to the geometrical correction values produced to determine a range of allowable loads necessary to produce a range of target geometrical correction values in a used component substantially free of structural imperfections (step 40). FIG. 6 is a graph illustrating an empirically generated correlation between loads applied (vertical axis) for desired geometric correction produced (horizontal axis), which is based on trials completed on a series of turbine blade samples. In FIG. 6, the asymptotic curve 56 represents the correlation between the load applied to the geometric correction produced, which curve 56 may be generated using, for example, the load and corresponding geometric correction data generated from the testing of the sample components (step 36). Curve 56 may also account for any destructively analyzed sample components, which, upon inspection, exhibit structural imperfections. Therefore, in FIG. 6, curve 56 may include only geometric correction values from samples that do not exhibit structural imperfections. Using the correlation between the applied loads and the corresponding geometric corrections produced, a maximum allowable load may be determined, such as load line 58 shown in FIG. 6. Therefore, from the correlation between load and geometric correction illustrated in FIG. 6, a maximum allowable load, illustrated as load line 58, may be determined below which a range of allowable loads may be applied to produce a range of target geometric correction values in a used turbine component without producing structural imperfections such as micro-cracking.

In addition to correlating the loads applied to the geometrical correction values produced to determine a range of allowable loads necessary to produce a range of target geometrical correction values in a used component substantially free of structural imperfections (step 40), method 30 of FIG. 3 also includes modifying the range of allowable loads to account for one or more repair process steps that change the geometric correction values after the loads have been applied to the used component (step 42). Repair processes for certain gas turbine engine components, such as turbine blade 10, may necessitate post geometric correction processing that tends to change the amount of correction produced by the applied load. For example, the blade 10 of FIGS. 1A and 1B including the twisted airfoil 16 may be subjected to a twist correction repair process developed using methods according to the present invention. Twist angle 22 of airfoil 16 may be corrected by restraining root 12 of blade 10 and applying a torsional load to shroud 18 using a wrench. However, repair of blade 10 may also necessitate heat treating blade 10 to, for example, reduce residual stresses created during the twisting step. Heat treating blade 10 in turn may have the secondary effect of causing airfoil 16 to "un-twist" slightly, thereby partially undoing the twist correction. In such cases, the maximum allowable load, i.e. the maximum torsional load applied to shroud 18 of blade 10, may be increased to "over-twist" airfoil 16 enough to account for the un-twisting caused by heat treatment.

Methods according to the present invention may be used to develop turbine component repair processes with several advantages over known repairs. Methods according to the present invention may be employed to develop repair processes by determining critical repair process inputs, e.g. the magnitude of load applied to a geometrically deformed gas turbine engine component, necessary to produce target repair process outputs, e.g. the geometric correction produced in the component from the applied load, while simultaneously substantially reducing the risk of deleterious effects of the repair, such as initiating micro-cracking in the component. Methods according to the present invention also account for repair process steps that affect the geometric corrections produced by the applied loads, such as the un-twisting effect of post twist correction heat treatment of a turbine blade airfoil. Embodiments of the present invention may therefore be employed to develop robust and efficient repair processes, which are less subject to, for example, ad-hoc operator application, production of unacceptable structural imperfections, and over-correction of geometric deformations in the turbine components under repair.

Although the present invention has been described with reference to preferred embodiments, workers skilled in the art will recognize that changes may be made in form and detail without departing from the spirit and scope of the invention.

The invention claimed is:

1. A method of developing a repair process for a gas turbine engine component deformed during engine operation, the method comprising:
    determining one or more peak stress locations under an applied load in an analytical model of the component;
    applying a plurality of loads to a plurality of sample components based on the model to produce a plurality of geometrical correction values in the samples;
    generating data from the samples comprising the loads applied and the geometrical correction values produced;
    destructively analyzing the samples at the peak stress locations for one or more structural imperfections;
    correlating the loads applied to the geometrical correction values produced to determine a plurality of allowable loads necessary to produce a plurality of target geometrical correction values in a used component substantially free of structural imperfections; and
    determining, using one or more processors, a first repair process input based upon the plurality of target geometrical correction values.

2. The method of claim 1, wherein determining the peak stress locations comprises electronically analyzing a computer generated model of the component.

3. The method of claim 1, wherein determining the peak stress locations comprises determining one or more locations in the analytical model of the component at which the component will yield under an applied load.

4. The method of claim 1, wherein applying a plurality of loads to a plurality of sample components based on the model to produce a plurality of geometrical correction values comprises twisting a plurality of sample airfoils to produce a plurality of twist angle correction values in the sample airfoils.

5. The method of claim 1, wherein applying a plurality of loads to a plurality of sample components based on the model to produce a plurality of geometrical correction values comprises applying a plurality of axial loads toward a tip of a plurality of sample airfoils to produce a plurality of lean correction values in the sample airfoils.

6. The method of claim 1, wherein destructively analyzing the samples at the peak stress locations for one or more structural imperfections comprises:
    cutting the samples along one or more cut lines intersecting the peak stress locations; and
    inspecting the samples for one or more structural imperfections.

7. The method of claim 6, wherein inspecting the samples comprises microscopically inspecting the samples for one or more structural imperfections.

8. The method of claim 1, wherein the one or more structural imperfections comprise micro-cracking.

9. The method of claim 1 further comprising:
    identifying a second repair process input that produces a secondary effect on the geometry of the component; and
    modifying the plurality of allowable loads to account for the secondary effect of the second repair process input, wherein the first repair process input incorporates the modified plurality of allowable loads 10. The method of claim 9, wherein the one or more repair process steps comprise heat treating the used component to reduce residual stresses.

11. The method of claim 9, wherein the first repair process input comprises applying a twist correction load to the component, and the second repair process input comprises heat treatment.

12. A method of developing a repair process for a gas turbine engine airfoil deformed during engine operation, the method comprising:
    determining one or more peak stress locations under an applied load in a model of the airfoil;

applying a plurality of loads to a plurality of sample airfoils based on the model to produce a plurality of geometrical correction values in the samples;

generating data from the samples comprising the loads applied and the geometrical correction values produced;

destructively analyzing the samples at the peak stress locations for one or more structural imperfections;

correlating the loads applied to the geometrical correction values produced to determine a plurality of allowable loads necessary to produce a plurality of target geometrical correction values in a used airfoil substantially free of structural imperfections; and determining, using one or more processors, a first repair process input based upon the plurality of target geometrical correction values.

13. The method of claim 12, wherein determining the peak stress locations comprises electronically analyzing a computer generated model of the airfoil.

14. The method of claim 12, wherein determining the peak stress locations comprises determining one or more locations in the model of the airfoil at which the airfoil will yield under an applied load.

15. The method of claim 12, wherein destructively analyzing the samples at the peak stress locations for one or more structural imperfections comprises:

cutting the samples along one or more cut lines intersecting the peak stress locations; and inspecting the samples for one or more structural imperfections.

16. The method of claim 12, wherein applying a plurality of loads to a plurality of sample airfoils based on the model to produce a plurality of geometrical correction values comprises twisting a plurality of sample airfoils to produce a plurality of twist angle correction values in the sample airfoils.

17. The method of claim 12, wherein applying a plurality of loads to a plurality of sample airfoils based on the model to produce a plurality of geometrical correction values comprises applying a plurality of axial loads toward a tip of the plurality of sample airfoils to produce a plurality of lean correction values in the sample airfoils.

18. The method of claim 12 further comprising:

identifying a second repair process input that produces a secondary effect on the geometry of the airfoil; and modifying the plurality of allowable loads to account for the secondary effect of the second repair process input, wherein the first repair process input incorporates the modified plurality of allowable loads 19. The method of claim 18, wherein the first repair process input comprises applying a twist correction load to the airfoil, and the second repair process input comprises heat treatment.

20. The method of claim 12, wherein the one or more repair process steps comprise heat treating the used airfoil to reduce residual stresses.

21. A method of developing a repair process for a gas turbine engine blade deformed during engine operation, the method comprising:

determining one or more peak stress locations in a model of the blade;

applying a plurality of loads to a plurality of sample blades based on the model to produce a plurality of geometrical correction values in the samples;

generating data from the samples comprising the loads applied and the geometrical correction values produced;

destructively analyzing the samples at the peak stress locations for one or more structural imperfections;

correlating the loads applied to the geometrical correction values produced to determine a plurality of allowable loads necessary to produce a plurality of target geometrical correction values in a used blade substantially free of structural imperfections;

identifying a heat treatment process input that produces a secondary effect on the geometry of the blade;

modifying the plurality of allowable loads to account for the secondary effect of the heat treatment process input; and determining a twist correction load to apply to the blade using a twist correction tool as a repair process input based upon the modified plurality of allowable loads and the plurality of target geometrical correction values.

22. The method of claim 21, wherein determining the peak stress locations comprises electronically analyzing a computer generated model of the blade.

23. The method of claim 21, wherein determining the peak stress locations comprises determining one or more locations in the model of the blade at which the blade will yield under an applied load.

24. The method of claim 21, wherein destructively analyzing the samples at the peak stress locations for one or more structural imperfections comprises:

cutting the samples along one or more cut lines intersecting the peak stress locations; and inspecting the samples for one or more structural imperfections.

25. The method of claim 21, wherein the one or more structural imperfections comprise micro-cracking.

* * * * *